Dec. 5, 1967     G. A. EDWARDS     3,356,424
BALL SPLINE ASSEMBLY
Filed April 30, 1965
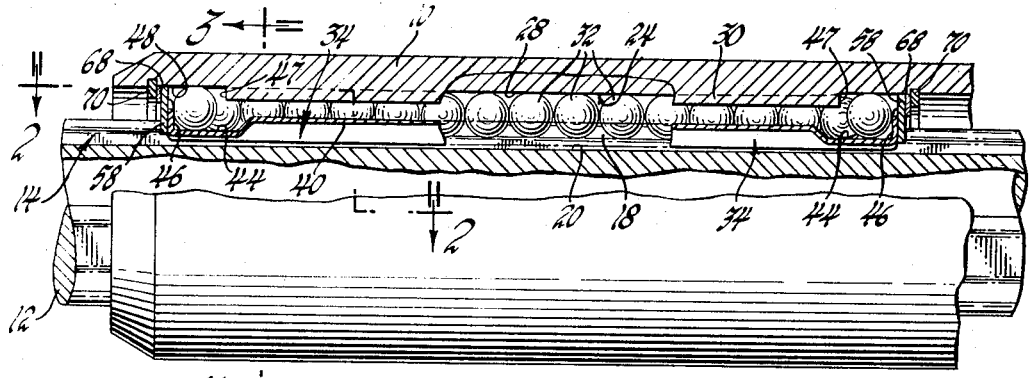
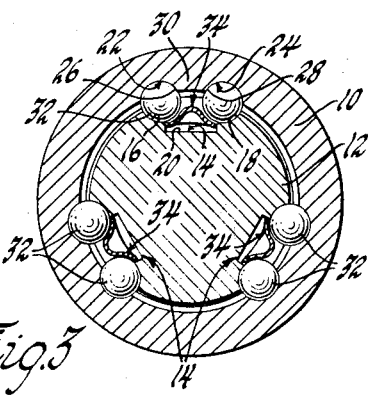
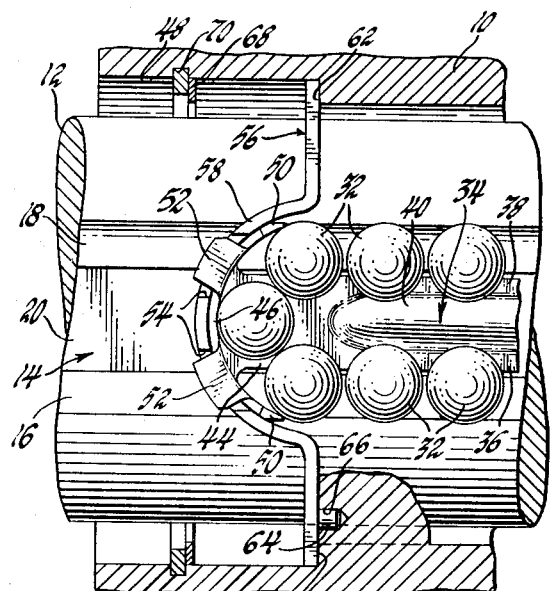
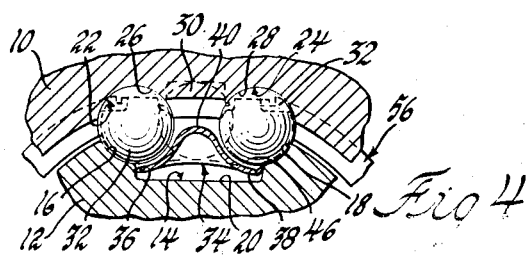
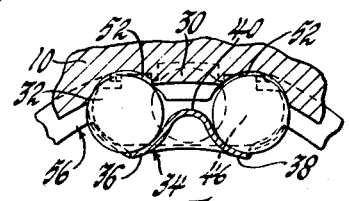
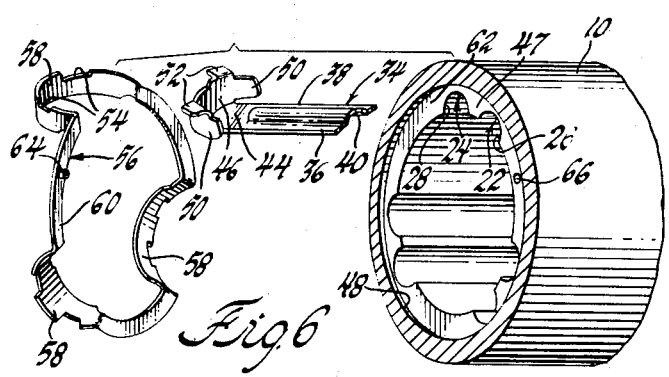
INVENTOR.
George A. Edwards
BY
A. M. Leiter
ATTORNEY

3,356,424
BALL SPLINE ASSEMBLY
George A. Edwards, Saginaw, Mich., assignor to General Motors Corporation, Detroit, Mich., a corporation of Delaware
Filed Apr. 30, 1965, Ser. No. 452,070
4 Claims. (Cl. 308—6)

ABSTRACT OF THE DISCLOSURE

A ball spline assembly having a ball retainer member with an endless trough for retaining the balls in a pair of circumferentially spaced races. The troughs have integral ball guides and there are provided annular retainer supports having tongue and slot connections with the ball guides and pockets fitting the ball guides connecting the ball retainer member to the spline member.

---

This invention relates to ball spline assemblies and more particularly to a ball retainer and guide for retaining the balls on one of the ball spline members prior to final assembly and thereafter guiding the balls for recirculation.

The assembly of ball spline members is facilitated by having the balls retained by a ball retainer on one of the ball spline members prior to their mating. Ball recirculation for extensive relative movement between the spline members is afforded by having ball guides for guiding the balls to and from a loaded race, to and from a return path. While the ball retainer and guides of the prior art have proven generally satisfactory, they often do not meet the required standards of versatility of application and simplicity of structure tailored to economical production.

The principle of this invention lies in the provision of ball retainer and guide members supported on one of the spline members which ball retainer and guide members provide endless troughs receivable in accommodating spaces between the ball spline members for retaining the balls in the ball grooves of the one spline member prior to mating of the ball spline members. Ball guides depending from the troughs are provided for guiding the balls to and from a loaded race, to and from an unloaded ball return path after assembly and during torque transmittal.

The invention is an improvement over devices of the type shown in United States copending application Serial No. 451,937, Ball Spline Assembly, now Patent No. 3,304,745, inventors Kenneth K. King and Donald P. Marquis and is illustrated as being employed in a ball spline assembly having an outer spline member which member has pairs of outer races cooperating with pairs of inner races on an inner spline member to provide pairs of cooperating races for receiving balls for torque transmittal. For each associated pair of outer races, there is provided a ball retainer and guide member having an endless trough which trough is receivable in an accommodating recess in the inner spline member between associated inner races and has integral ball guides for guiding the balls on the troughs between the associated pair of cooperating races for ball recirculation.

The ball retainer and guide members are supported at each end in the outer spline member by tongues on the ball guides which tongues are received in accommodating grooves in a ball guide support, the latter being retained at each end on the outer spline member by a backup ring and snap ring and being prevented from relative, angular movement by a support pin which is received in an accommodating aperture provided in the outer spline member. The endless troughs retain the balls in endless trains in the associated pairs of outer races of the outer spline member prior to final assembly of the inner spline member. At final assembly, the endless trains of balls engage their associated pairs of inner races on the inner spline member whereafter the balls are guided between their respective loaded and unloaded races by the associated troughs and ball guides upon relative sliding movement between the spline members as one of the ball spline members is rotated, the loading and unloading of the races being determined by the direction of torque transmittal.

An object of this invention is to provide a new and improved ball retainer and guide for a ball spline.

Another object of this invention is to provide for a ball spline assembly, a ball retainer with depending guides for retaining the balls on one of the ball spline members and for guiding the balls to and from a loaded race, to and from an unloaded ball return path.

Another object of this invention is to provide in a ball spline subassembly, a cylindrical member having pairs of longitudinally extending ball grooves, endless troughs for retaining the balls in the ball grooves and ball guides on the troughs for providing ball recirculation and for securing the troughs by separate ball retainer support members to the cylindrical member.

These and other objects of the invention will be more apparent from the following description and drawing:

FIGURE 1 is a longitudinal view with parts in section showing a ball spline assembly having ball retainer and guide means constructed according to this invention.

FIGURE 2 is a view taken substantially on the line 2—2 of FIGURE 1.

FIGURE 3 is a view taken substantially on the line 3—3 in FIGURE 1.

FIGURE 4 is an enlarged view of a portion of FIGURE 3.

FIGURE 5 is a view like FIGURE 4 but with the inner spline member removed.

FIGURE 6 is an exploded view of part of the left end of the FIGURE 1 assembly.

Referring first to FIGURE 1 of the drawing, the ball spline assembly comprises an outer cylindrical ball spline member 10 encircling and circumjacent an inner cylindrical ball spline member 12 of greater length. As best shown in FIGURE 3, inner spline member 12 has three external, circumferentially-equally-spaced, parallel and axially-extending grooves 14, each groove providing a pair of annularly-spaced inner ball races 16 and 18 and an intermediate recess 20 rectangular in cross section, the purpose of the recesses being more clearly understood from the description of the ball retainer and guide structure described in detail later. For each groove of inner spline member 12, the outer spline member 10 has a pair of internal grooves 22 and 24 providing a pair of outer ball races 26 and 28, respectively, which races are separated at their inner edges by a guide rib 30.

The outer ball races 26 and 28 are complementary to and cooperate with the longer inner ball races 16 and 18, respectively, for receiving files of balls 32 to provide the ball spline connection between the spline members. The three, circumferentially-equally-spaced associated pairs of ball races are employed to accurately locate the inner and outer spline members concentrically.

The ball retainer and guide assembly, for retaining the balls on the outer spline member 10 prior to its mating with the inner spline member 12 and for thereafter connecting the ends of the associated pairs of complementary races to provide endless ball circuits whereby the files of balls become endless trains of balls, comprises a one-piece ball retainer and guide member 34 for each pair of internal grooves 22 and 24. The ball retainer and guide assembly is symmetrical about a vertical axis through its mid point, reference FIGURE 1, with each ball retainer and guide member 34 being preferably of stamped metal construction and having a double-trough, elongated, intermediate portion provided by troughs or rails 36 and 38 arcuate shaped in cross section, as viewed in FIGURE 3, separated by a raised, rounded rib 40 of reverse curvature, which rib projects in the direction of and has clearance with the associated guide rib 30 of the outer spline member 10.

Confined arcuate paths for connecting the opposite ends of troughs 36 and 38 to provide one endless trough are provided by bridges 44 on members 34 and arcuate guides 46 depending from their associated bridges 44 located opposite their associated guide rib end 47. The bridges 44 extend transverse to the races and are arcuate shaped in cross section, as shown in FIGURE 4, to follow the wall contour of counterbores 48 provided in the opposite ends of outer spline member 10, which counterbores receive the guides. The difference in radius between the bridges 44 and counterbores 48 slightly exceeds the diameter of the balls to permit unrestricted crossing of the balls during recirculation which is explained in greater detail later. The guides 46 have depending, axially-extending ball deflector fingers 50 at their opposite, circumferential ends, as best shown in FIGURE 2, which fingers are arranged at the ends of the associated pair of races for the balls to impinge against and be deflected around the guide rib ends 47 to and from one of the associated pair of races, to and from the other of the associated pair of races.

The three ball retainer and guide members 34 are secured at each end to the outer spline member 10 with the aid of a pair of tabs or tongues 52 depending from each guide 46, which tongues are received in accommodating grooves 54 provided in a retainer support 56. The supports 56 are received in the counterbores 48 and, in addition to having the slots for receiving the ball guide tongues for radial support and angular and axial location of members 34, also have arcuate-shaped pockets 58 contoured to closely fit guides 46 including fingers 50 to aid in locating the ball retainer and guide members 34 in position.

Supports 56 are in turn secured to the outer spline member 10 and have flat ring portions 60 intermediate the pockets 58 for abutment with the counterbore step 62. A pin 64, protruding from one of the flat ring portions 60 of each support 56, is accommodated by a blind hole 66 provided in the counterbore step 62 to prevent relative rotation between the ball retainer supports 56 and the outer spline member 10 and thus prevents relative rotation between the ball retainer and guide members and the outer spline member. A backup ring 68 abuts the outermost axial extension of the pockets 58 of each retainer support 56 to give a flat surface contact for a snap ring 70 received in an accommodating groove in the counterbores 48. The snap rings with the aid of the backup rings hold the retainer supports against axial movement and thus the ball retainer and guide members are made secure to the outer spline member.

Thus, the ball retainer and guide assembly, of which parts of one end are shown exploded in FIGURE 6, can be easily and quickly assembled with the balls in place from the outboard ends of the outer spline member 10. To demonstrate, one of the retainer supports is first secured in place with its backup ring and snap ring. The ball retainer and guide members are then positioned at one end with the tongues at this one end sliding from the inboard retainer support side into the slots of the secured ball retainer support. Next, the balls are inserted in the endless troughs at the yet free ends of the ball retainer and guide members. Then, the remaining retainer support is slipped axially into place with its slots receiving the tongues of the previously free ends of the ball retainer and guide members whereafter the backup ring and snap ring for this retainer support are fitted in place.

As best shown in FIGURE 5, prior to insertion of inner spline member 12, the troughs 36 and 38 cooperate with their associated ball grooves 22 and 24, respectively, to prevent the balls from dropping out of their ball grooves, the opening between each trough and the associated ball groove edge opposite the guide rib being less than the diameter of the balls. The balls at the crossovers between the associated pairs of ball grooves are held in the counterbores 48 by the bridges 44 and guides 46. Thus, the ball retainer and guide members retain the complete trains of endless balls in the outer races in the outer spline member prior to final assembly and mating of the outer spline member with the inner spline member.

After mating of the spline members, the balls engage the inner ball races of the inner spline member and ride free of the troughs 36 and 38, as best shown in FIGURE 4, the troughs being located at a radius less than the inner radius edge of the inner ball races. The balls are then guided crosswise or transverse of the races between their loaded and unloaded races by the ball guides and bridge portions of the endless troughs during torque transmittal and upon sliding movement of one of the spline members relative to the other, the loaded and unloaded races being determined by the direction of torque transmittal.

For example, when the inner spline member 12 is driven in the clockwise direction, as viewed in FIGURE 3, the balls in inner ball race 16 will be urged against the ball race 26 in the area of guide rib 30, while at the same time the normal clearance in the ball spline connections permits slight clockwise rotation of inner spline member 12 relative to outer spline member 10 so that the balls in ball races 18 and 28 are unloaded. Consequently, when the inner spline member 12 is moved in one direction relative to the outer spline member 10, the loaded balls in races 16 and 26 will roll in the direction of movement of inner spline member 12.

The balls rolling in races 16 and 26 will then eventually impinge against one of the guide fingers 50 as best shown in FIGURE 2, pass over the associated bridge 44 while being guided around the associated guide rib end 47 by the associated guide 46 and then be deflected by the other associated deflected finger to the unloaded raceway provided by races 18 and 28. Under these conditions, the balls in races 18 and 28 must move in the direction opposite the direction of movement of the inner spline member 12. These balls thus roll under unloaded conditions until they eventually impinge against one of the deflector fingers at the opposite end of the ball retainer and guide member whereupon they cross over the associated bridge and are guided by the associated ball guide for return by the associated ball deflector finger to the start of the loaded race. This ball recirculation will continue until the relative axial movement is terminated. Since the complete ball spline assembly including the ball retainer and guide structure, is symmetrical about both a longitudinal and a vertical axis, the complete assembly functions equally as well upon movement of the inner spline member relative to the outer spline member in the opposite direction and when the inner spline member is driven in a counterclockwise direction as viewed in FIGURE 3.

During relative movement between the spline members, the entire ball retainer and guide assembly rides freely of the inner spline member 12. This is provided by having sufficient clearance between the troughs and the walls of the inner spline member recesses and between the guides, including the deflector fingers and the inner ball races of the inner spline member.

The above-described preferred embodiment is illustrative of the invention which may be modified within the scope of the appended claims.

I claim:
1. In combination, a cylindrical member having a pair of circumferentially spaced ball grooves, balls in each of said ball grooves, a ball retainer and guide member having an endless trough for retaining said balls in said grooves including longitudinally-extending and parallel trough portions with respect to which said balls overhang a distance less than the radius of said balls, said ball retainer and guide member having arcuate guides depending from said trough located crosswise of and at opposite ends of said grooves for guiding said balls in an endless train to and from the ends of one groove, to and from the ends of the other groove and retainer support means including retainer supports having both tongue and groove connections with said guides and pockets fitting said guides for supporting said ball retainer and guide member in a fixed position on said cylindrical member.

2. In combination, a cylindrical member having pairs of circumferentially-spaced, longitudinally-extending ball grooves, an elongated ball retainer and guide member for each pair of grooves having an endless trough and positioned on said cylindrical member, an endless train of balls received in each said trough and the associated pair of grooves, said cylindrical member having counterbores whose steps meet with the ends of said grooves, each said trough having depending, arcuate-shaped guides at the opposite ends of the associated ball retainer and guide member, said guides being located in said counterbores and crosswise of the ends of the associated pair of ball grooves and having depending, arcuate-shaped deflector fingers providing smooth, curved paths between the outer edges of the ends of their associated pair of grooves for smoothly guiding the balls to and from the ends of one of their associated pair of grooves, to and from the ends of the other of their associated pair of grooves, each said trough further having elongated, side by side trough portions intermediate said guides having clearances with respect to the outer edges of their associated pair of grooves of a distance less than the diameter of the balls whereby said balls extend past said intermediate trough portions a distance less than the radius of said balls, annular retainer supports received in said counterbores having flat portions abutting said steps, tongue and groove connections with said guides and arcuate portions closely fitting said guides including said deflector fingers, each said retainer support and said cylindrical member having a pin connection preventing relative angular movement, a backup ring abutting the arcuate portions of each said retainer support and a snap ring fitted on said cylindrical member and abutting each said backup ring for holding the flat portions of said retainer supports against said steps whereby said ball retainer and guide members are supported in position in said cylindrical member.

3. In a ball spline assembly the combination of telescopically related members complementary grooved to provide a pair of circumferentially-spaced ball races therebetween, said pair of ball races being provided by a single groove in one member and a pair of grooves in the other member, ball retainer means freely received by said single groove providing an endless trough having guide means depending from portions of said trough providing arcuate guideways operatively connecting said races to provide an endless ball circuit, balls mounted in said endless ball circuit, portions of said trough extending along the length of the ball grooves of said other member without contacting said balls when said members are assembled, and engaging said balls along the entire length of said trough for retaining said balls in said pair of grooves of said other member when said one member is removed and retainer support means including annular retainer supports through which said one member freely extends having both tongue and groove connections with said guide means and pockets receiving said guide means for connecting said ball retainer means to said other member.

4. In combination, an outer cylindrical spline member having pairs of circumferentially-spaced, longitudinally-extending grooves, an inner cylindrical spline member received in said outer spline member and having a groove for cooperating with each pair of outer spline member grooves to provide pairs of circumferentially-spaced, longitudinally-extending races, said outer spline member having counterbores whose steps meet with the ends of said outer spline member grooves, an elongated ball retainer and guide member for each pair of races having an endless trough having depending guides with depending deflector fingers located in said counterbores and at opposite ends of the associated outer spline member grooves for providing arcuate passageways connecting the ends of the associated races to provide endless ball circuits, an endless train of balls in each of said ball circuits, each said trough having elongated, side by side trough portions extending the length of the outer spline member grooves and having clearances with respect to the outer edges of their associated pair of outer spline member grooves of less than the diameter of the balls for permitting said balls to extend freely through said clearances for full contact in said races, said troughs engaging said balls along their entire train lengths to retain said balls on said outer spline member when said inner spline member is removed, annular retainer supports received in said counterbores having flat portions abutting said steps and arcuate portions closely fitting said guides including said fingers, said arcuate portions having tongue and groove connections with their associated guides, each said retainer support and said outer spline member having a pin connection preventing relative, angular movement, a backup ring abutting the arcuate portions of each said retainer support and a snap ring fitted on said outer spline member abutting each said backup ring whereby said ball retainer and guide members are securely fixed in position on said outer spline member.

References Cited

UNITED STATES PATENTS

| | | | |
|---|---|---|---|
| 640,397 | 1/1900 | Merker | 308—6 X |
| 2,503,009 | 4/1950 | Thomson | 308—6 |
| 2,628,135 | 2/1953 | Magee | 308—6 |
| 2,787,144 | 4/1957 | Channel | 64—23 |
| 2,791,894 | 4/1957 | Duckworth | 64—23.7 |
| 2,845,782 | 8/1958 | Glover | 64—23 |
| 2,981,569 | 4/1961 | Danly | 308—6 |
| 2,983,120 | 5/1961 | White | 64—23 |
| 3,046,808 | 7/1962 | De Mart | 308—6 |
| 3,070,405 | 12/1962 | Hulck | 308—6 |
| 3,210,136 | 10/1965 | Anderson | 308—6 |

MARTIN P. SCHWADRON, *Primary Examiner.*

L. L. JOHNSON, *Assistant Examiner.*